United States Patent [19]
Crisafulli

[11] Patent Number: 5,354,373
[45] Date of Patent: * Oct. 11, 1994

[54] INJECTION HEADS FOR RAILROAD TIE TREATING APPARATUS

[76] Inventor: Joseph T. Crisafulli, P.O. Box 865, Glendive, Mont. 59330

[*] Notice: The portion of the term of this patent subsequent to Sep. 10, 2008 has been disclaimed.

[21] Appl. No.: 740,430

[22] Filed: Aug. 5, 1991

Related U.S. Application Data

[63] Continuation-in-part of Ser. No. 439,321, Nov. 21, 1989, Pat. No. 5,046,448.

[51] Int. Cl.[5] .................................. B05C 3/20
[52] U.S. Cl. ..................... 118/410; 118/407; 401/265; 401/193
[58] Field of Search .......... 118/410, 407, 305; 141/287, 312, 368, 383; 239/589, 602, DIG. 19; 423/568; 156/578, 145; 401/9, 265, 193

[56] References Cited

U.S. PATENT DOCUMENTS

| | | | |
|---|---|---|---|
| 1,140,514 | 5/1915 | Haverstick | 141/368 |
| 2,093,870 | 9/1937 | Lang | 118/407 |
| 2,273,984 | 2/1942 | Osborn | 141/383 |
| 3,099,582 | 7/1963 | Ongstad et al. | 156/579 |
| 3,173,166 | 3/1965 | Christensen | 156/579 |
| 3,534,788 | 10/1970 | Vergobbi | 141/287 |
| 4,047,497 | 9/1977 | Grobler | 141/287 |
| 4,272,017 | 6/1981 | Franz | 118/410 |
| 5,115,844 | 5/1992 | Hansen | 118/410 |

FOREIGN PATENT DOCUMENTS 1141966 6/1986 Japan .................................. 118/410

Primary Examiner—W. Gary Jones
Assistant Examiner—Brenda Lamb
Attorney, Agent, or Firm—Jacobson, Price, Holman & Stern

[57] ABSTRACT

Injection heads for a railroad tie treating apparatus by which a flowable treating material can be injected through unused or unoccupied spike holes in railroad rail tie plates which anchor the bottom flange of a railroad rail to the wooden ties. Each of the injection heads include a structure enabling the injection head to be sealingly engaged with tie plate in order to prevent leakage of the treating material between the injection head and tie plate with several embodiments of the invention being disclosed to assure efficient discharge of the flowable treating material between the bottom surface of the tie plates and the adjacent surface areas of the wooden ties.

10 Claims, 2 Drawing Sheets

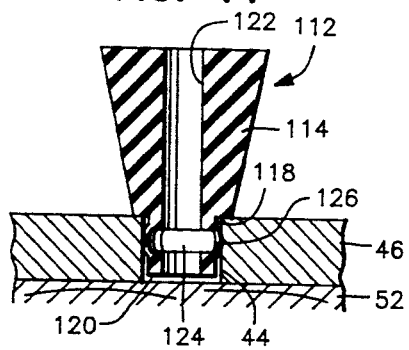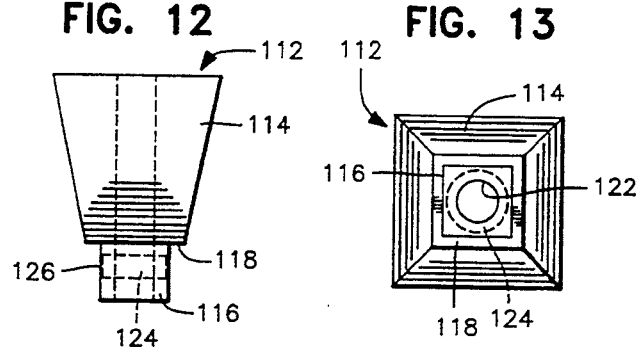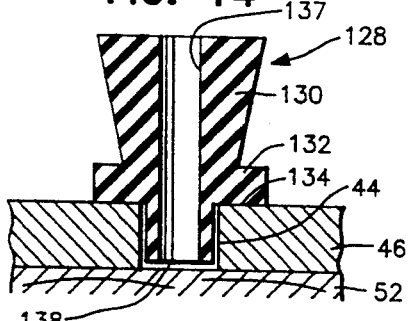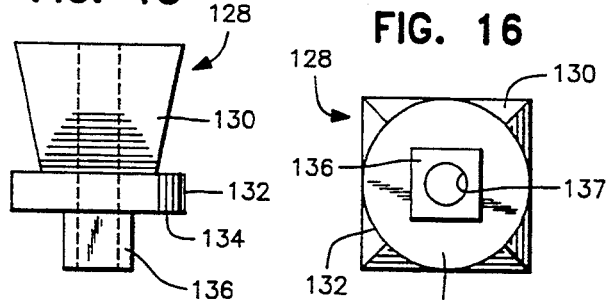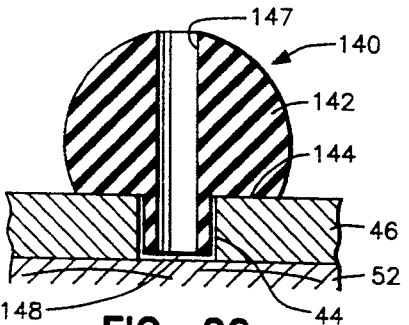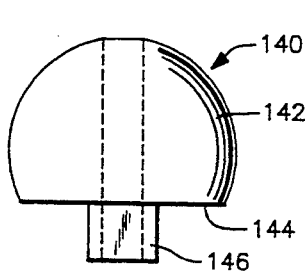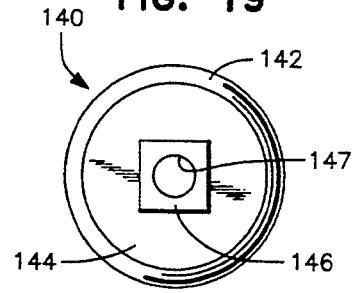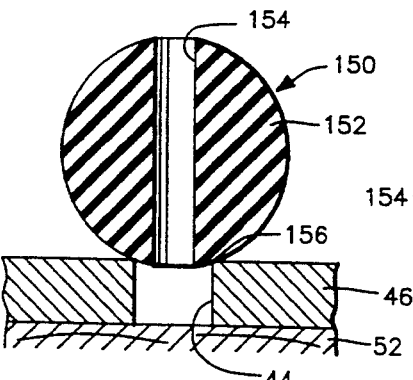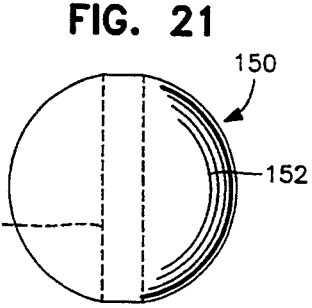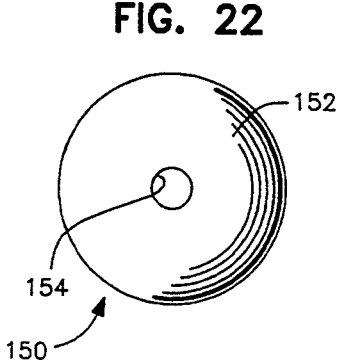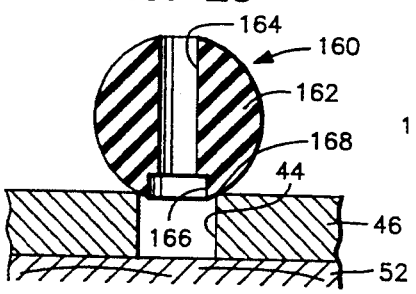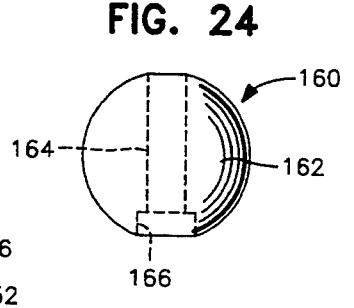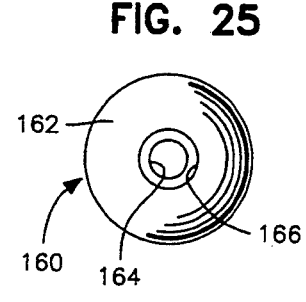

INJECTION HEADS FOR RAILROAD TIE TREATING APPARATUS

CROSS REFERENCE TO RELATED APPLICATION

This application is a continuation-in-part of my co-pending application U.S. Ser. No. 07/439,321 filed Nov. 21, 1989 now U.S. Pat. No. 5,046,448 issued Sep. 10, 1991. for Railroad Tie Treating Method and Apparatus.

BACKGROUND OF INVENTION

1. Field of the Invention

The present invention generally relates to a railroad tie treating apparatus and more specifically to injection heads for such an apparatus by which a flowable treating material can be injected through unused or unoccupied spike holes in railroad rail tie plates which anchor the bottom flange of a railroad rail to the wooden ties. Each of the injection heads includes a structure enabling the injection head to be sealingly engaged with the tie plate in order to prevent leakage of the treating material between the injection head and tie plate with several embodiments of the invention being disclosed to assure efficient discharge of the flowable treating material between the bottom surface of the tie plates and the adjacent surface areas of the wooden ties.

2. Description of the Prior Art

My prior U.S. Pat. No. 4,746,553 issued May 24, 1988 discloses a vehicular apparatus having flanged wheels movable on railroad rails and discloses the basic concept of injecting a treating material through one or more unoccupied spike holes in the rail supporting tie plate. This patent and the prior art of record therein is made of record in this application by reference thereto. In addition, co-pending application U.S. Ser. No. 07/439,321 now U.S. Pat. No. 5,046,448 discloses portable embodiments of a treating apparatus and the references of record in that application are incorporated herein by reference thereto.

None of the prior art discloses an injection head having specific structural characteristics that enable quick, easy and extremely effective sealing engagement with a peripheral portion of an unoccupied spike hole in a railroad rail tie plate which supports the rail from the wood tie in order to inject fluid treating material between the bottom surface of the tie plate and the upper surface of the wooden tie in an efficient manner without leakage of the treating material around the periphery of the upper end of the unoccupied spike hole.

SUMMARY OF THE INVENTION

An object of the present invention is to provide an injection head for a railroad tie treating apparatus constructed of resilient material and incorporating structural features enabling a portion of the injector head to engage an unoccupied spike hole in the tie plate and to be sealingly engaged with the tie plate to prevent leakage of flowable treating material between the injection head and tie plate.

Another object of the invention is to provide an injection head of resilient construction including several embodiments some of which include a portion telescopically related to the unoccupied hole and several engaging the upper end of the unoccupied hole in sealing relation with each embodiment of the injection head including a passageway receiving pressurized flowable treating material that is mounted on the lower end of a tubular wand with a manual control valve being provided to control the discharge of treating material through the injection head.

A further object of the invention is to provide injection heads in accordance with the preceding objects including structural features in certain embodiments which enable the portion of the injection head inserted into the unoccupied hole to be expanded radially into sealing engagement with the inner surface of the unoccupied hole.

Still another object of the invention is to provide injection heads in accordance with the preceding objects which are relatively inexpensive to manufacture, easy to operate and effective in providing a seal between the injection head and the tie plate to discharge flowable treating material between the tie plate and the wooden tie and prevent leakage of liquid treating material between the injection head and tie plate.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 11, 12 and 13 are vertical sectional, side elevational and bottom plan views of a fourth embodiment of the invention.

FIGS. 14, 15 and 16 are vertical sectional, side elevational and bottom plan views of a fifth embodiment of the invention.

FIGS. 17, 18 and 19 are vertical sectional, side elevational and bottom plan views of a sixth embodiment of the invention.

FIGS. 20, 21 and 22 are vertical sectional, side elevational and bottom plan views of a seventh embodiment of the invention.

FIGS. 23, 24 and 25 are vertical sectional, side elevational and bottom plan views of an eighth embodiment of the invention.

DESCRIPTION OF THE PREFERRED EMBODIMENTS

Figure 1:
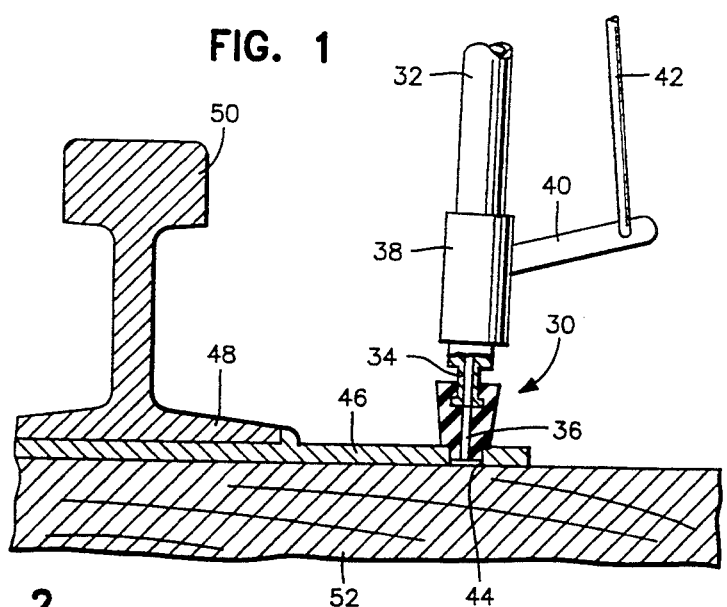
FIG. 1 is a schematic sectional view illustrating the manner of using the injection heads of the present invention in association with a railroad rail, tie plate and wooden tie.

FIG. 1 of the drawings illustrates the injection head designated by reference numeral 30 mounted on the lower end of a tubular pipe or wand 32 having the lower end in the form of a discharge tube 34 telescopically received in a passageway 36 in the injection head 30. A valve structure 38 is provided at the lower end of the wand 32 and includes an actuator 40 in the form of a laterally extending arm connected to an operating rod 42 that extends upwardly to a control lever all as generally disclosed in co-pending application Ser. No. 07/439,321. This enables a flowable treating material to be injected through an unoccupied spike hole 44 in a tie plate 46 conventionally employed to secure the bottom flange 48 of a railroad rail 50 to a wooden tie 52 in which an anchoring spike is normally driven through at least one of the holes in the tie plate and at least one hole in the tie plate is left unoccupied in order to receive the injection head 30. In FIGS. 2-25 the tie plate 46, the hole 44 therethrough and the wooden tie 52 are designated by the same reference numerals. Each embodiment of the injection head will be provided with different reference numerals even though there are similarities in the various embodiments.

Figure 2:
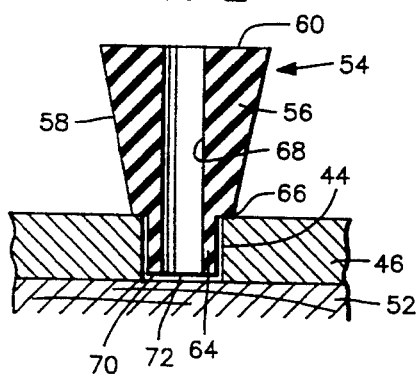
FIGS. 2, 3 and 4 are vertical sectional, side elevational and bottom plan views of one embodiment of the invention.
Figure 3:
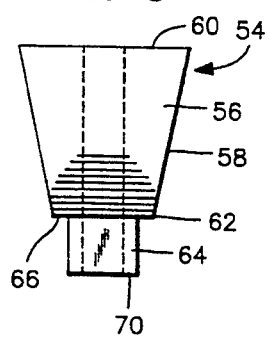
Figure 4:
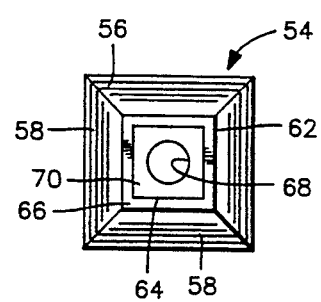

FIGS. 2-4 disclose one embodiment of the injection head generally designated by reference numeral 54 and which includes a resilient body 56 having downwardly converging flat side surfaces 58 defining a square upper end 60 and a square lower end 62. Projecting axially from the lower end 62 of the body 56 is a projection 64 which is also of square configuration as illustrated in FIGS. 3 and 4 but of a smaller perimeter than the perimeter of the bottom edge 62 of the body 56 thus defining a horizontally disposed peripheral shoulder 66 which will engage the top surface of the tie plate 46 peripherally of the hole 44 when the projection 64 is inserted downwardly into the hole 44. A passageway 68 of circular transverse configuration extends through the body 56 and the projection 64 which are of one piece construction with the upper end of the passageway 68 telescopically receiving and being anchored to the discharge tube 34 on the wand 32. As illustrated in FIG. 2, the length of the projection 64 is slightly less than the vertical dimension of the hole 44 thus spacing the bottom edge 70 of the projection 64 from the upper surface of the tie 52 and above bottom surface of the tie plate 46 with this space being designated by reference numeral 72 thus assuring that material discharged through the passageway 68 will have access to the upper surface of the wooden tie 52 in order for it to migrate laterally outwardly between the wood tie 52 and the tie plate 56 with downward pressure being exerted on the wand to provide a positive seal between the shoulder 66 and the upper surface of the tie plate 44 peripherally of the hole 44 to prevent leakage therebetween.

Figure 5:
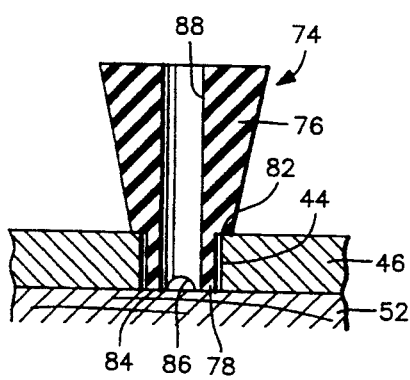
FIGS. 5, 6 and 7 are vertical sectional, side elevational and bottom plan views of a second embodiment of the invention.
Figure 6:
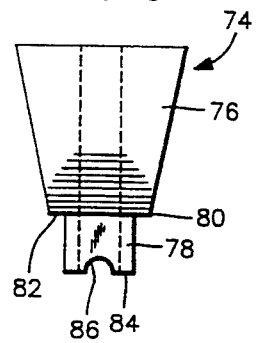
Figure 7:
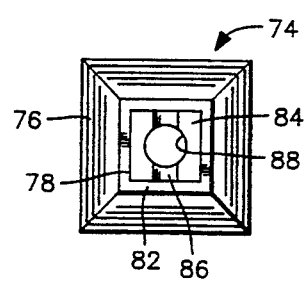

FIGS. 5-7 illustrate a second embodiment of the invention generally designated by reference numeral 74 and including a square, downwardly tapering body 76 identical to the body 56 in FIGS. 2-4 and including a depending square projection 78 integral with the lower edge 80 of the body 76 with the square configuration of the projection being smaller than the lower edge 80 of the body 76 to define a peripheral horizontal shoulder 82 to sealingly engage with the upper surface of the tie plate 46 when the projection 78 is inserted into the tie plate hole 44 as illustrated in FIG. 5. The lower end 84 of the projection includes a pair of diametrically opposed, generally semi-circular notches 86 oriented in opposed relation and intersecting a vertical passageway 88 extending through the body 76. The notches 86 assure free flow of treating material from the passageway 88 laterally outwardly to the periphery of the projection 78. The vertical height of the projection 78 may be substantially the same as or slightly less than the thickness of the plate 46 to assure sealing engagement between the shoulder 82 and the upper surface of the tie plate 46. In this embodiment, as well as in the embodiment in FIGS. 2-4, the peripheral dimensions of the projection is slightly less than the internal perimeter of the hole 44 to facilitate insertion of the projection.

Figure 8:
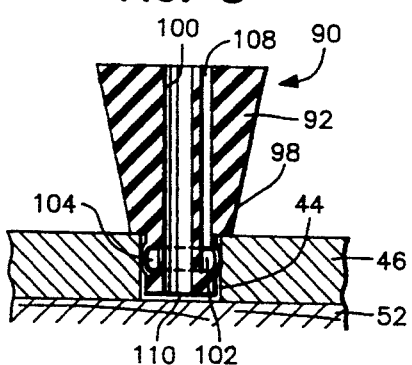
FIGS. 8, 9 and 10 are vertical sectional, side elevational and bottom plan views of a third embodiment of the invention.
Figure 9:
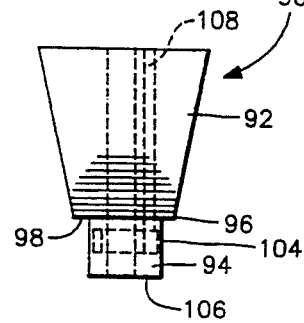
Figure 10:
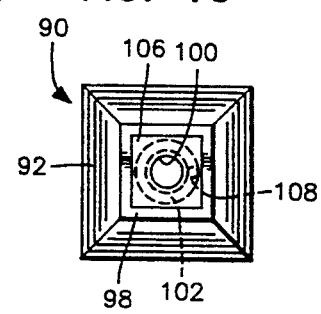

FIGS. 8-10 illustrate another embodiment of the injection head generally designated by reference numeral 90 which includes a square tapering body 92 provided with a projection 94 of square configuration but of less peripheral dimensions as compared to the bottom edge 96 of the body 92 thus forming a horizontal shoulder 98 which engages the upper surface of the tie plate 46 peripherally of the hole 44. A vertical passageway 100 extends through the body 92 and projection 94. In this embodiment of the invention, the projection 94 includes an annular passageway 102 positioned outwardly of and concentric with the lower end of the passageway 100 with the distance between the outer surface of the projection 94 and the annular recess 102 being relatively thin, flexible and resilient. This outer portion of the projection is designated by reference numeral 104 and is spaced below the shoulder 98 and above the bottom edge 106 of the projection 94 as illustrated in FIGS. 8 and 9. A vertical passageway 108 of less cross-sectional dimension than the passageway 100 extends vertically from the annular passageway 102 to the upper end of the body 92 in adjacent but spaced relation to the passageway 100. The passageway 108 is communicated with the pressurized supply of flowable treating material in order to pressurize the passageway 108 and the annular passageway 102 which forms a bladder which is expanded radially outwardly into sealing engagement with the inner surface of the hole 44 in the tie plate 46 thus forming a seal between the periphery of the projection 94 and the internal surface of the hole 44 in the tie plate 46. The shoulder 98 sealingly engages the upper surface of the tie plate and the vertical length of the projection is slightly less than the height of the hole 44 in the tie plate thus assuring sealing engagement of the shoulder with the tie plate and providing a space 110 between the lower end of the projection 94 and the wooden tie 52 to assure flow of material outwardly between the tie plate 46 and the wood tie 52. When the treating operation has been completed and the pressurized supply of treating material cut-off by the valve structure, the pressure will be released from the passageway 102 and passageway 108. In this arrangement, the valve structure will pressurize the passageway 108 and passageway 102 just prior to the pressurized treating material being introduced into the passageway 100 and likewise, the pressure through the passageway 100 will be released just prior to the pressure in the passageway 108 and 102.

FIGS. 11-12 illustrate a fourth embodiment of the invention designated by reference numeral 112 and includes a body 114 of square tapering configuration similar to the previously disclosed embodiments. The lower end of the body 114 is provided with a projection 116 and a horizontally disposed shoulder 118 with the projection 116 extending into the hole 44 in the tie plate 46 with the height of the projection 116 being less than the vertical height of the hole 44 thus providing a space 120 between the lower end of the projection 116 and the wooden tie 52 to enable treating material to flow outwardly. A vertical passageway 122 is provided through the body and projection and adjacent the lower end of the projection, an annular recess or groove 124 is formed in the passageway 122 to form a very thin, resilient, flexible expandable sealing bladder 126 which is expanded when pressure is supplied through the passageway 122 with expansion of the bladder 126 providing a seal between the projection 116 and the inner surface of the hole 44 in the tie plate with the shoulder 118 also sealingly engaged with the upper surface of the tie plate. In this embodiment, the pressurized treating material will enter the peripheral groove or recess 124 and expand the flexible, resilient bladder forming the outer wall of the groove into sealing engagement with the hole 44.

FIGS. 14–16 disclose a fifth embodiment of the invention designated by reference numeral 128 which includes a downwardly tapering square body 130 similar to those disclosed in FIGS. 2-13 but in this form of the invention, a peripheral horizontal flange 132 is provided at the lower edge of a body 130 with the flange being of circular cross-sectional configuration and forming a downwardly facing shoulder 134 of circular external perimeter together with a depending square projection 136 of integral construction therewith with the body 130 flange 132 and projection 136 including a passageway 137 therethrough for receiving pressurized treating material. The length of the projection 136 below the shoulder 134 is less than the vertical height of the hole 44 in the tie plate 46 to provide a space 138 between the lower end of the projection 136 and the upper surface of the wooden tie 52 to facilitate migration of fluid treating material between the tie plate and wood tie. The shoulder 134 engages the upper surface of the tie plate 46 as illustrated in FIG. 14 thus forming an effective seal for the periphery of the hole 44 to prevent leakage between the injection head 128 and the tie plate 46.

FIGS. 17–19 illustrate a sixth embodiment of the injection head generally designated by reference numeral 140 and which includes a generally spherical body 142 having a flat lower end defining a downwardly facing horizontally disposed shoulder 144 having a centrally disposed depending square projection 146 formed integrally with the body 142. A vertical passageway 147 extends through the body 142 and through the projection 146 which is telescopically received in the hole 44 in the tie plate 46. The length of the projection 146 is slightly less than the vertical height of the hole 44 to provide a space 148 for passage of the treating material when the shoulder 144 sealingly engages the upper surface of the tie plate 46 as illustrated in FIG. 17.

FIGS. 20–22 illustrate a seventh embodiment of the invention generally designated by reference numeral 150 and including a spherical body 152 having a vertical passageway 154 therethrough. In this embodiment of the invention, the spherical peripheral surface of the body 152 sealingly engages the upper end of the hole 42 at 156 that is peripherally spaced from the lower end of the passageway 154 thus communicating the passageway 154 with the hole 44 and forming a seal between the upper end of the hole 44 and the body 152 as indicated by reference numeral 156 thus preventing leakage between the body 152 and the tie plate 46.

FIGS. 23–25 illustrate another embodiment of the injection head generally designated by reference numeral 160 which includes a spherical ball 162 having a vertical passage 164 therethrough. Where the vertical passage 164 communicates with the lower surface of the spherical body 162, there is a peripheral recess 166 to provide an enlargement of the passageway 164 and to increase the resiliency and flexibility of the portion of the body 162 between the periphery of the recess 166 and the adjacent periphery of the spherical body 162 where the spherical body 162 engages the upper edge of the hole 44 as indicated by reference numeral 168 thereby providing a more flexible and resilient engagement between the ball 162 and the tie plate 46 thereby preventing leakage between the body 162 and the tie plate 46.

In each embodiment of the invention, the body is of one piece construction of solid, resilient material that will sustain its shape but yet be sufficiently resilient and flexible to sealingly engage with the tie plate to provide an effective seal between the body and tie plate thereby preventing leakage of the treating material past the interface between the external surface of the body and the tie plate thereby assuring that all of the pressurized material passing through the injection head will be discharged in the lower end of the tie plate hole 44 with the pressurization of the treating material forcing the treating material outwardly between the upper surface of the wooden tie and the lower surface of the tie plate. The projection in each form of the invention is square to conform with the configuration of the tie plate hole 44 with the external dimensions of the projection being slightly less than the internal dimensions of the tie plate hole for ease in telescopic engagement. In each embodiment of the invention, the passageway through the body has direct communication with the tie plate hole with the peripheral sealing engagement of the body with the tie plate hole providing an effective seal that is maintained by downward thrust being exerted on the wand which is being manually manipulated and controlled by an operator.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In an apparatus for treating wooden tie supporting railroad rails by injecting a flowable treating material through unoccupied spike holes in tie plates which secure the rails to the ties, the improvement comprising an injection head connected with a manually manipulated, valve controlled rigid wand, said injection head comprising a body of resilient material having a passageway therethrough receiving pressurized treating material from the wand, said body having a bottom surface thereon in sealing engagement with the tie plate peripherally of the unoccupied hole with the passageway in communication with the hole for passage of pressurized treating fluid into the hole and between the tie plate and the upper surface of the wooden tie, the bottom surface on said body including a downwardly facing shoulder, a projection depending from the shoulder and telescopically received in the hole in the tie plate, said projection including means at its lower end discharging treating material peripherally thereof to enable treating material to flow along the upper surface of the wooded tie and between the tie plate and the wooden tie.

2. The structure as defined in claim 1 wherein the length of said projection is less than the vertical height of the tie plate hole to form a space between the upper surface of the wooden tie and the lower end of the projection when the shoulder on the body engages the upper surface of the tie plate with this space providing means for discharging treating fluid peripherally of the projection at the lower end thereof.

3. The structure as defined in claim 1 wherein said projection includes at least one radially extending notch in the lower end edge thereof providing means for discharging treating fluid peripherally of the projection when the shoulder on the body is in sealing engagement with the tie plate.

4. The structure as defined in claim 1 wherein said projection includes an annular chamber therein isolated from the passageway and the external surface of the projection by a relatively thin wall, a passageway communicating with the chamber for pressurizing the chamber and expanding the thin wall defining the outer wall of the chamber radially outwardly into sealing engagement with the interior surface of the hole in the tie plate.

5. The structure as defined in claim 1 wherein said projection includes an annular recess communicating with the passageway and defined by a thin outer wall portion of the projection, pressurized treating fluid passing through the passageway entering the annular recess and expanding the thin wall outwardly into sealing engagement with the internal surface of the tie plate hole.

6. The structure as defined in claim 1 wherein said shoulder extends peripherally and radially outwardly beyond the body to provide a large surface area in contact with the upper surface of the tie plate, said projection being shorter than the vertical height of the tie plate hole to space the lower end thereof from the wooden tie to provide means for discharging treating fluid from the lower end of the body.

7. The structure as defined in claim 6 wherein said body tapers from a larger upper end to a smaller lower end, said projection being of square transverse configuration corresponding to the shape of the tie plate hole with the projection having an external dimension slightly less than the internal dimension of the tie plate hole to enable telescopic engagement of the projection into the tie plate hole.

8. The structure as defined in claim 7 wherein said body is of square transverse cross-sectional configuration with the four sides of the body converging downwardly to a square lower end with the square projection being of less external dimension than the lower end of the body thereby defining a horizontally disposed peripheral shoulder of square configuration.

9. The structure as defined in claim 1 wherein said body is of generally spherical configuration provided with a flat bottom surface defining a shoulder, said projection depending from the flat bottom surface and being of square cross-sectional configuration to telescopically engage the tie plate hole, said projection having a length less than the vertical height of the tie plate hole to space the lower end of the projection from the upper surface of the wooden tie when the shoulder on the body engages the tie plate to provide means for discharging treating material from the lower end of the projection.

10. In an apparatus for treating the upper surface area of wooden ties which support railroad rails secured to the ties by tie plates and spikes with each tie plate including at least one unoccupied hole by injecting a flowable treating material through the unoccupied spike holes in tie plates which secure the rails to the ties with the treating material flowing laterally of the tie plate hold and along the upper surface of the tie, the improvement comprising an injection head connected with a manually manipulated, valve controlled rigid wand, said injection head comprising a body of resilient material having a passageway therethrough receiving pressurized treating material from the wand, said body having a bottom surface thereon in sealing engagement with the tie plate peripherally of the unoccupied hole with the passageway in communication with the tie plate hole for passage of pressurized treating fluid into the hole and between the tie plate and the upper surface of the wooden tie, the lower end of the passageway including an internal enlargement in communication with the tie plate hole to reduce the thickness of the area of the body between the periphery of the internal enlargement and the external periphery of the body where it engages the periphery of the upper end of the tie plate hole thereby increasing the flexibility and resiliency characteristics of the portion of the body which engages the tie plate hole to more effectively sealingly engage the periphery of the tie plate hole.

* * * * *